United States Patent
Zhang et al.

(10) Patent No.: US 10,421,061 B2
(45) Date of Patent: Sep. 24, 2019

(54) PREPARATION METHOD OF ALUMINA-CARBON NANO TUBE COMPOSITE POWDER MATERIAL

(71) Applicant: HOHAI UNIVERSITY, Nanjing, Jiangsu (CN)

(72) Inventors: Jianfeng Zhang, Jiangsu (CN); Yunyi Liu, Jiangsu (CN); Gaiye Li, Jiangsu (CN); Yilin Su, Jiangsu (CN); Xiao Liang, Jiangsu (CN); Yuna Wu, Jiangsu (CN); Yuping Wu, Jiangsu (CN)

(73) Assignee: HOHAI UNIVERSITY, Nanjing, Jiangsu (CN)

(*) Notice: Subject to any disclaimer, the term of this patent is extended or adjusted under 35 U.S.C. 154(b) by 0 days.

(21) Appl. No.: 15/737,917

(22) PCT Filed: May 6, 2016

(86) PCT No.: PCT/CN2016/081283
§ 371 (c)(1),
(2) Date: Dec. 19, 2017

(87) PCT Pub. No.: WO2017/067147
PCT Pub. Date: Apr. 27, 2017

(65) Prior Publication Data
US 2018/0169625 A1 Jun. 21, 2018

(30) Foreign Application Priority Data

Oct. 19, 2015 (CN) .......................... 2015 1 0680629

(51) Int. Cl.
*B01J 21/04* (2006.01)
*B01J 23/755* (2006.01)
(Continued)

(52) U.S. Cl.
CPC ............. *B01J 23/755* (2013.01); *B01J 21/04* (2013.01); *B01J 21/185* (2013.01); *B01J 23/745* (2013.01);
(Continued)

(58) Field of Classification Search
None
See application file for complete search history.

(56) References Cited

U.S. PATENT DOCUMENTS

2006/0078489 A1* 4/2006 Harutyunyan ......... B82Y 30/00
423/447.3
2007/0025906 A1* 2/2007 Pirard .................... B01J 8/003
423/447.3
(Continued)

FOREIGN PATENT DOCUMENTS

| CN | 1699151 | 11/2005 |
|---|---|---|
| CN | 105198447 | 12/2015 |
| JP | 2011195371 | 10/2011 |

OTHER PUBLICATIONS

Argarwal et al.; In Situ Carbon Nanotube Reinforcements in a Plasma-Sprayed Aluminum Oxide Nanocomposite Coating; Acta Materialia; 56, pp. 571-579; 2008.*
(Continued)

*Primary Examiner* — Guinever S Gregorio
(74) *Attorney, Agent, or Firm* — Rankin, Hill & Clark LLP

(57) ABSTRACT

A preparation method of an alumina-carbon nano tube composite powder material includes the steps of using an organometallic precursor as a raw material, using metal nanoparticles formed on the surface of the alumina powder as a catalyst, and simultaneously feeding a carbonaceous gas such as methane and acetylene, so as to grow a carbon nano tube in situ, and obtain an alumina-metal nanoparticle-carbon nano tube composite powder material through a (Continued)

chemical vapor deposition method under a temperature condition of 400 to 800° C. Through changing various parameters such as the weight of the organic raw material, the flow or constituent of reactant gases and reaction temperature, the decomposition of the organic raw material and the generation of the metal nanoparticles and the carbon nano tube are adjusted, and the size and the microstructure of the powder are controlled.

8 Claims, 1 Drawing Sheet

(51) Int. Cl.
| | | |
|---|---|---|
| C04B 35/628 | (2006.01) | |
| B01J 21/18 | (2006.01) | |
| B01J 23/745 | (2006.01) | |
| B01J 35/00 | (2006.01) | |
| B01J 37/02 | (2006.01) | |
| C04B 35/632 | (2006.01) | |
| C01B 32/16 | (2017.01) | |
| C01F 7/02 | (2006.01) | |
| B82Y 30/00 | (2011.01) | |
| B82Y 40/00 | (2011.01) | |

(52) U.S. Cl.
CPC ....... *B01J 35/0013* (2013.01); *B01J 37/0223* (2013.01); *B01J 37/0244* (2013.01); *C01B 32/16* (2017.08); *C01F 7/022* (2013.01); *C04B 35/628* (2013.01); *C04B 35/62839* (2013.01); *C04B 35/62884* (2013.01); *C04B 35/6325* (2013.01); *B82Y 30/00* (2013.01); *B82Y 40/00* (2013.01); *C01P 2004/61* (2013.01); *C01P 2004/62* (2013.01); *C01P 2006/80* (2013.01); *C04B 2235/3217* (2013.01); *C04B 2235/3272* (2013.01); *C04B 2235/3279* (2013.01); *C04B 2235/449* (2013.01); *C04B 2235/5288* (2013.01); *C04B 2235/5436* (2013.01); *C04B 2235/5445* (2013.01); *Y10S 977/742* (2013.01); *Y10S 977/843* (2013.01)

(56) References Cited

U.S. PATENT DOCUMENTS

2007/0154382 A1\* 7/2007 Edwin .................. B01J 4/002
 423/447.3
2016/0160394 A1\* 6/2016 Hocke .................. B01J 23/84
 423/447.2

OTHER PUBLICATIONS

Wei et al.; Parameter Setting on Growth of Carbon Nanotubes Over Transition Metal/Alumina Catalysts in a Fluidized Bed Reactor; Powder Technology; 192, 16-22; 2009.\*
International Search Report filed in PCT/CN2016/081283 dated Aug. 16, 2016.

\* cited by examiner

PREPARATION METHOD OF ALUMINA-CARBON NANO TUBE COMPOSITE POWDER MATERIAL

TECHNICAL FIELD

The present invention particularly relates to a method of generating a carbon nano tube in alumina ceramic powder, and belongs to the field of material processing engineering.

BACKGROUND

Ceramic materials like alumina and zirconia are widely used at present, have the characteristics of corrosion resistance, oxidation resistance, and big specific surface area, and can be used as absorbent, catalyst carriers, composite material reinforcer, high-speed cutting tools, medical materials, and anti-wear parts. A carbon nano tube has multiple advantages of big specific surface area, ultra-high modulus, high intensify and good conductibility, has wide application prospect in multiple fields including high-performance composite materials, medical materials, and electron field emission devices, has wide application prospect, and can also be used as an alumina reinforcer to improve the properties of the alumina like conductivity and catalytic activity, etc. However, because the carbon nano tube has one-dimensional nanostructure characteristics, the length-diameter ratio is large; meanwhile, because of the large Van der Waals force and huge specific surface area between carbon nano tubes, the carbon nano tube is easy to exist in a tangled aggregate. How to prepare and disperse the carbon nano tube in the alumina powder becomes a key factor to play the excellent performance of the carbon nano tube.

At present, there are more preparation methods of carbon nano tubes, including a catalytic cracking method, a chemical vapor deposition method, a template method, or the like. When preparing alumina-carbon nano tube composite powder, metal nanoparticles (catalyst) are firstly mixed with alumina in general, and then carbonaceous gases like methane and acetylene are fed, to form a carbon nano tube through thermal decomposition. Lee et al, prepared alumina nanowires and carbon nano tubes by filling alumina inside the carbon nano tube and covering the carbon nano tube on the surface of the alumina through a chemical vapor deposition method [Lee J et al. Journal of Crystal Growth, 2003, 254(4): 443-448]. Some researchers prepared or purchased the carbon nano tube, and then directly mixed the carbon nano tube with alumina to obtain composite powder. For example, Ahma et al, purchased a commercial carbon nano tube, then chemically modified the multi-wall carbon nano tube by using $H_2SO_4$—$HNO_3$ acid mixture solution, and added surfactant and □-$Al_2O_3$ for ultrasonic dispersion, and then dried the mixture for standby. (Ahma et al., Materials Characterization, 2015, 99: 210-219). In the patent published by Wu Xiwang et al (Chinese Patent Publication Number: CN 103979942 A), a carbon nano tube and alumina powder were added into fused thermoplastic polymer melt to stir and mix; the mixture was added into a double screw extruder or a single screw extruder to extrude and disperse till it is stable; the extruded material was degreased under a high temperature to remove polymer materials and obtain carbon nano tube-alumina composite powder. An in situ producing method has the advantages of simple and convenient preparation and low cost, and has aroused widespread concern. Zhang Xinghong et al, invented a method for synthesizing carbon nano tube modified ultra-high temperature ceramic hybrid powder in situ (Chinese Patent Publication No.: CN 104016685 B), which sufficiently dispersed a catalyst in an organic polymer precursor to obtain mixed powder firstly; then put the mixed powder obtained into a square mold of which the upper part was open, heated the power in a tube furnace for cracking till the complete ceramization temperature of the organic polymer precursor was 1450 to 1550□, and carried out heat preservation for 0.5 to 2 hours; then naturally cooled the powder to 20□ to 25□, thus obtaining the carbon nano tube modified ultra-high temperature ceramic hybrid powder. However, the method still has the problems of complicated steps and high processing temperature, etc.

SUMMARY

The prevent invention aims at providing a preparation method of an alumina-carbon nano tube composite powder material, which is a method of loading a carbon nano tube on the surface of alumina ceramic powder, which generates nickel, iron, cobalt and other metal nanoparticle catalyst on the surface of the alumina ceramic powder through the decomposition of an organometallic precursor, thus decomposing and catalyzing carbon in the organometallic precursor and carbon in gases like methane to generate the carbon nano tube, controls the length, diameter and microstructure of the carbon nano tube by changing multiple factors including organic raw material supply amount, rotating speed and reaction temperature, shortens the preparation period and reduces the cost since the foregoing step of preparing the carbon nano tube is omitted, and improves the dispersing homogeneity and effectiveness of the carbon nano tube.

In order to achieve the above-mentioned technical objects, the present invention provides a preparation method of an alumina-carbon nano tube composite powder material, comprising the following steps of:

(1) pretreating alumina powder by drying and sieving, and then placing the treated alumina powder into a chemical vapor deposition reaction chamber, vacuumizing to 5 to 20 Pa, and preheating to a reaction temperature;

(2) rotating the chemical vapor deposition reaction chamber, wherein a rotating speed is 15 to 60 rpm;

(3) using an organometallic precursor as a raw material and heating the organometallic precursor in a vaporizer to 100 to 200□ to obtain mixed gas of raw materials, wherein the mass ratio of the organometallic precursor to the alumina powder is 1 to 3:5;

(4) opening a vaporizer valve, introducing the mixed gas of the raw materials into the chemical vapor deposition reaction chamber, and introducing argon gas in the meanwhile to decompose the organometallic precursor, so as to deposit the metal nanoparticles on the alumina powder;

(5) when conducting step (4), feeding carbonaceous gases into the rotating chemical vapor deposition reaction chamber to provide an extra carbon source and generate a carbon nano tube by means of the catalytic action of the metal nanoparticles and the decomposition of the carbonaceous gases, wherein the carbon nano tube is dispersed on the surface of the alumina and the metal nanoparticles to obtain coated power;

(6) after completing the reaction, stopping the rotation of the chemical vapor deposition reaction chamber, closing the vaporizer valve, cooling to a room temperature, and removing the coated power; and (7) sieving the powder obtained by step (6).

In particular, in step (1), the temperature is preheated to a temperature of 400 to 800□

Preferably, in step (1), the average particle size of the alumina powder is 0.1 to 100 μm, and the purity of the powder is more than 95%.

In step (3), the organometallic precursor is any one of nickel iso-caprylate, nickelocene, ferrocene, and iron acetate.

Preferably, in step (5), the carbonaceous gas is any one of methane or acetylene or a mixture of the two.

Preferably, both in step (1) and step (6), the powder is sieved by 3 to 4 times by a 50 to 200-mesh sieve.

In step (4), the gas flow of the argon gas is 50 to 100 sccm.

In step (5), the gas flow of the carbonaceous gas is 10 to 100 sccm.

The present invention has the beneficial effects that: the present invention provides a preparation method of an alumina-carbon nano tube powder material, which uses a rotating chemical vapor deposition technology to catalyze nanoparticles by metal and make the nanoparticles be directly deposited on an $Al_2O_3$ support; meanwhile, the carbon nano tube can be generated by a carbon chain decomposed by the organometallic precursor and decomposition of the carbonaceous gases like methane. The particle size and microstructure of the obtained composite material are controlled by changing the experimental parameters of the reaction of the organic raw materials and methane, so that the carbon nano tube and the metal particles are evenly dispersed on the alumina support, so that the utilization of the materials and the reliability of the products are greatly improved; moreover, the preparation period is short, and no solution is used in the preparation method, thus avoiding the problem of waste liquor treatment; the method is environment-friendly, and the production cost thereof is significantly reduced; therefore, the composite material has excellent industrial prospect.

DETAILED DESCRIPTION

Figure 1:
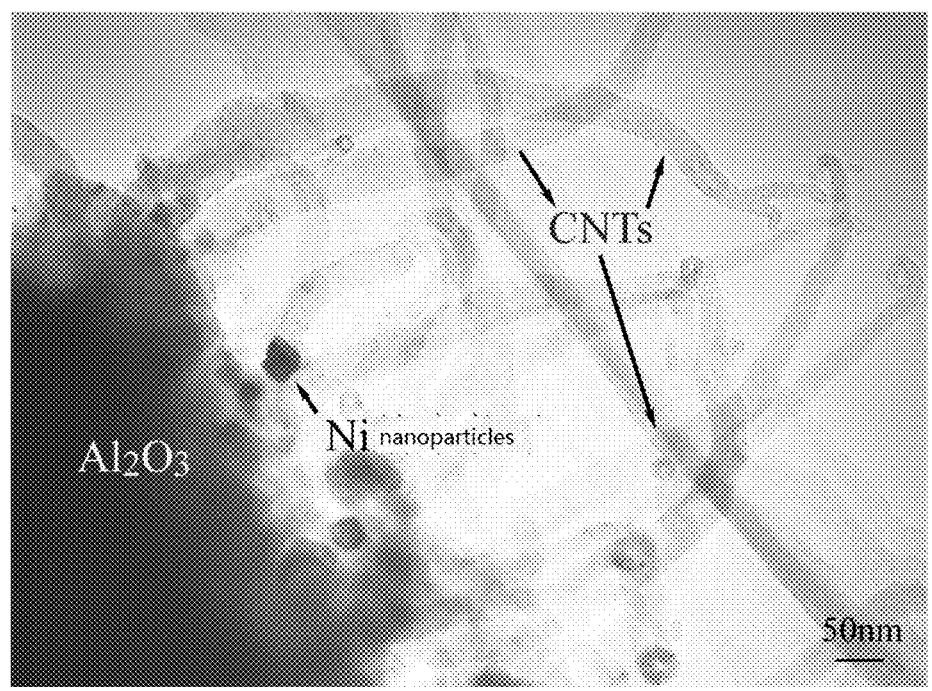
FIG. 1 is a transmission electron microscope of an alumina-carbon nano tube composite powder material obtained under experimental parameters of embodiment 1.

The following are merely preferred embodiments of the invention, which are intended to be illustrative of the invention only, rather than to limit the invention, and improvements made from this description shall all fall within the scope of protection as defined by the appended claims of the invention.

Embodiment 1

The embodiment provides a preparation method of an alumina-carbon nano tube composite powder material, comprising the following preparation steps of:

(1) drying alumina powder (the average diameter of the powder was 10 μm, and the purity of the powder was more than 95%), sieving the powder by a 200-mesh sieve for three times so as to break hard agglomerate produced by placing the powder for a long time, then placing 5 g treated powder into a chemical vapor deposition reaction chamber, vacuumizing to 5 Pa, and warming up to 600° C.;

(2) rotating the chemical vapor deposition reaction chamber, wherein a rotating speed was 15 rpm;

(3) using 1 g organometallic precursor nickelocene (Ni $(C_5H_5)_2$) as a raw material and heating the raw material to 150□ in a vaporizer to obtain mixed gas of the raw material;

(4) opening a vaporizer valve, introducing the mixed gas of the raw material in step (3) into the chemical vapor deposition reaction chamber, and introducing argon gas in the meanwhile to decompose the organometallic precursor, so as to deposit the metal nanoparticles on the alumina powder, wherein the gas flow of the argon gas was 100 sccm, and the deposit time was 2 h;

(5) when conducting step (4), feeding methane into the rotating chemical vapor deposition reaction chamber, generating a carbon nano tube by means of the catalytic action of the metal nanoparticles and the decomposition of the methane, and dispersing the carbon nano tube on the surface of the alumina and the metal nanoparticles, wherein the gas flow of the methane was 30 sccm;

(6) after completing the reaction, stopping the rotation of the chemical vapor deposition reaction chamber, closing the vaporizer valve, cooling to a room temperature, and removing the coated power; and (7) sieving the powder obtained by step (6).

The removed alumina-carbon nano tube composite powder material was analyzed and observed.

Figure 2:
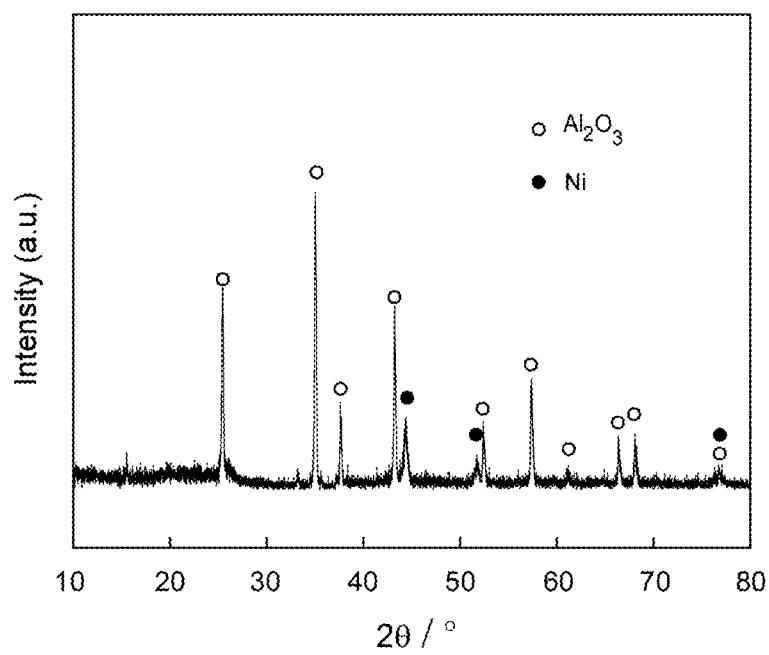
FIG. 2 is an X ray diffraction pattern of the alumina-carbon nano tube composite powder material obtained under the experimental parameters of embodiment 1.

The results were as shown in FIG. 1 and FIG. 2. FIG. 1 showed that the carbon nano tube with a diameter of about 50 nm and a length of about 1 to 2 μm vertically grew on the surface of the $Al_2O_3$ powder under the catalysis action of Ni nanoparticles. While a characteristic peak of the Ni nanoparticles generated was detected in FIG. 2. Because the carbon nano tube was amorphous, X-ray characteristic peak of carbon did not appear.

Embodiment 2

The embodiment provides a preparation method of an alumina-carbon nano tube composite powder material, comprising the following preparation steps of:

(1) drying alumina powder (the average diameter of the powder was 0.1 μm, and the purity of the powder was more than 95%), sieving the powder by a 200-mesh sieve for three times so as to break hard agglomerate produced by placing the powder for a long time, then placing 5 g treated powder into a chemical vapor deposition reaction chamber, vacuumizing to 5 Pa, and warming up to 400° C.;

(2) rotating the chemical vapor deposition reaction chamber, wherein a rotating speed was 30 rpm;

(3) (1) using 2 g organometallic precursor nickel acetate $(Ni(CH_3COO)_2)$ as a raw material and heating the material in an vaporizer to 100° C.;

(4) opening a vaporizer valve, introducing the mixed gas of the raw material into the chemical vapor deposition reaction chamber, and introducing argon gas in the meanwhile to decompose the organometallic precursor, so as to deposit the metal nanoparticles on the alumina powder, wherein the gas flow of the argon gas was 100 sccm, and the deposit time was 1 h;

(5) when conducting step (4), feeding methane into the rotating chemical vapor deposition reaction chamber, generating a carbon nano tube by means of the catalytic action of the metal nanoparticles and the decomposition of the methane, and dispersing the carbon nano tube on the surface of the alumina and the metal nanoparticles, wherein the gas flow of the methane was 10 sccm;

(6) after completing the reaction, stopping the rotation of the chemical vapor deposition reaction chamber, closing the vaporizer valve, cooling to a room temperature, and removing the coated power; and (7) sieving the powder obtained by step (6) by a 200-mesh sieve for three times to obtain the alumina-carbon nano tube composite powder material.

Embodiment 3

The embodiment provides a preparation method of an alumina-carbon nano tube composite powder material, comprising the following preparation steps of:

(1) drying alumina powder (the diameter of the powder was 100 μm), sieving the powder by a 200-mesh sieve for three times so as to break hard agglomerate produced by placing the powder for a long time, then placing 5 g treated powder into a chemical vapor deposition reaction chamber, vacuumizing to 20 Pa, and warming up to 800° C.;

(2) rotating a rotating reactor, wherein a rotating speed was 60 rpm;

(3) using 1.7 g organometallic precursor ferrocene (Fe $(C_5H_5)_2$) as a raw material and heating the material in an vaporizer to 200° C.;

(4) opening a vaporizer valve, introducing the mixed gas of the raw material into the chemical vapor deposition reaction chamber, and introducing argon gas in the meanwhile to decompose the organometallic precursor, so as to deposit the metal nanoparticles on the alumina powder, wherein the gas flow of the argon gas was 100 sccm, and the deposit time was 3 h;

(5) when conducting step (4), feeding methane into the rotating reactor, generating a carbon nano tube by means of the catalytic action of the metal nanoparticles and the decomposition of the methane, and dispersing the carbon nano tube on the surface of the alumina and the metal nanoparticles, wherein the gas flow of the methane was 100 sccm;

(6) after completing reaction, stopping the rotation of the reaction chamber, closing a valve, cooling to a room temperature, and removing the coated power; and (7) sieving the powder obtained by step (6) to obtain the alumina-carbon nano tube composite powder material.

Embodiment 4

The embodiment provides a preparation method of an alumina-carbon nano tube composite powder material, comprising the following preparation steps of:

(1) drying alumina powder (the diameter of the power was 1 μm), sieving the powder by a 200-mesh sieve for three times so as to break hard agglomerate produced by placing the powder for a long time, then placing 5 g treated powder into a chemical vapor deposition reaction chamber, vacuumizing to 20 Pa, and warming up to 700° C.;

(2) rotating a rotating reactor, wherein a rotating speed was 60 rpm;

(3) using organometallic precursor iron acetate (Fe $(CH_3COO)_2$) as a raw material and heating the material in an vaporizer to 180° C.;

(4) opening a vaporizer valve, introducing the mixed gas of the raw material into the chemical vapor deposition reaction chamber, and introducing argon gas in the meanwhile to decompose the organometallic precursor, so as to deposit the metal nanoparticles on the alumina powder, wherein the gas flow of the argon gas was 100 sccm, and the deposit time was 2 h;

(5) when conducting step (4), feeding methane into the rotating reactor, generating a carbon nano tube by means of the catalytic action of the metal nanoparticles and the decomposition of the methane, and dispersing the carbon nano tube on the surface of the alumina and the metal nanoparticles, wherein the gas flow of the methane was 100 sccm;

(6) after completing reaction, stopping the rotation of the reaction chamber, closing a valve, cooling to a room temperature, and removing the coated power; and (7) sieving the powder obtained by step (6) to obtain the alumina-carbon nano tube composite powder material.

According to the present invention, nickel, iron, cobalt and other metal nanoparticle catalyst are generated on the surface of the alumina ceramic powder through the decomposition of the organometallic precursor, thus decomposing and catalyzing carbon in the organometallic precursor and carbon in gases like methane to generate the carbon nano tube, and the length, diameter and microstructure of the carbon nano tube are controlled by changing multiple factors including organic raw material supply amount, rotating speed and reaction temperature, which shortens the preparation period and reduces the cost since the foregoing step of preparing the carbon nano tube is omitted, and improves the dispersing homogeneity and effectiveness of the carbon nano tube.

The foregoing description of the disclosed embodiments enables those skilled in the art to make or use the present invention. Various modifications to these embodiments will be apparent to those skilled in the art, and the generic principles defined herein may be embodied in other embodiments without departing from the spirit or scope of the invention. Therefore, the invention will not to be limited to the embodiments shown herein, but is to be in conformity with the widest scope consistent with the principles and novel features disclosed herein.

The invention claimed is:

1. A preparation method of an alumina-carbon nanotube composite powder material, comprising:
 (1) pretreating alumina powder by drying and sieving, and then placing the treated alumina powder into a chemical vapor deposition reaction chamber, vacuumizing to 5 to 20 Pa, and preheating to a reaction temperature;
 (2) rotating the chemical vapor deposition reaction chamber, wherein a rotating speed is 15 to 60 rpm;
 (3) using an organometallic precursor as a raw material and heating the organometallic precursor in a vaporizer to 100 to 200° C. to obtain a mixed gas of raw materials, wherein the mass ratio of the organometallic precursor to the alumina powder is 1 to 3:5;
 (4) opening a vaporizer valve, introducing the mixed gas of the raw materials into the chemical vapor deposition reaction chamber, and introducing argon gas to decompose the organometallic precursor, so as to deposit metal nanoparticles on the alumina powder;
 (5) feeding a carbonaceous gas into the rotating chemical vapor deposition reaction chamber to provide an extra carbon source and generate a carbon nanotube by means of the catalytic action of the metal nanoparticles and the decomposition of the carbonaceous gas, wherein the carbon nanotube is dispersed on the surface of the alumina and the metal nanoparticles to obtain coated power;
 (6) stopping the rotation of the chemical vapor deposition reaction chamber, closing the vaporizer valve, cooling to a room temperature, and removing the coated power; and (7) sieving the powder obtained by step (6).

2. The preparation method of an alumina-carbon nanotube composite powder material according to claim 1, wherein in step (1), the temperature is preheated to 400 to 800° C.

3. The preparation method of an alumina-carbon nanotube composite powder material according to claim 1, wherein in step (1), the average particle size of the alumina powder is 0.1 to 100 μm, and the purity of the powder s more than 95%.

4. The preparation method of an alumina-carbon nanotube composite powder material according to claim 1, wherein in step (3), the organometallic precursor is any one of nickel iso-caprylate, nickelocene, ferrocene, and iron acetate.

5. The preparation method of an alumina-carbon nanotube composite powder material according to claim 1, wherein in step (5), the carbonaceous gas is any one of methane or acetylene or a mixture of the two.

6. The preparation method of an alumina-carbon nanotube composite powder material according to claim 1, wherein both in step (1) and step (6), the powder is sieved by 3 to 4 times by a 50 to 200-mesh sieve.

7. The preparation method of an alumina-carbon nanotube composite powder material according to claim 1, wherein in step (4), the gas flow of the argon gas is 50 to 100 sccm.

8. The preparation method of an alumina-carbon nanotube composite powder material according to claim 1, wherein in step (5), the gas flow of the carbonaceous gas is 10 to 100 sccm.

* * * * *